United States Patent [19]

Bristol et al.

[11] Patent Number: 5,012,582
[45] Date of Patent: May 7, 1991

[54] HAND-HELD, BATTERY-OPERATED ROTARY BLADE SAW

[75] Inventors: Steven L. Bristol, Sweeny; Joseph D. Casanueva, Houston, both of Tex.

[73] Assignee: Bristol and Williams, Sweeny, Tex.

[21] Appl. No.: 451,198

[22] Filed: Dec. 15, 1989

[51] Int. Cl.⁵ .................. B23D 47/00; B27B 9/00; B27B 11/02

[52] U.S. Cl. .................................. 30/391; 30/390; 30/504

[58] Field of Search .................. 30/388, 390, 382, 391, 30/504, 510, 514, DIG. 1

[56] References Cited

U.S. PATENT DOCUMENTS

| | | | |
|---|---|---|---|
| 1,631,366 | 6/1927 | Feister | 30/390 |
| 1,816,966 | 8/1931 | Gray et al. | 30/390 |
| 3,040,790 | 6/1962 | Goodson | 30/504 |
| 3,389,323 | 6/1968 | Jepson et al. | 30/DIG. 1 |
| 4,249,313 | 2/1981 | Bates | 30/391 |
| 4,657,428 | 4/1987 | Wiley | 30/391 |

Primary Examiner—Douglas D. Watts
Assistant Examiner—Paul M. Heyrana, Sr.
Attorney, Agent, or Firm—Larry Mason Lee

[57] ABSTRACT

A hand-held, battery-operated rotary blade saw useful for cutting plastic clips or straps which secure a face mask to a football helmet. Several configurations, having differing safety shields, are disclosed. The device is an emergency/rescue tool to quickly remove a face mask from a football helmet allowing access to the face of a football player without removal of the helmet with its concomitant risk of cervical injury.

4 Claims, 5 Drawing Sheets

HAND-HELD, BATTERY-OPERATED ROTARY BLADE SAW

SUMMARY OF THE INVENTION

BACKGROUND OF THE INVENTION

The face mask of a modern football helmet is connected to the helmet with strong, pliable plastic straps and connectors. The helmet, itself, represents a marvel of modern safety engineering, with every precaution taken to reduce the probability of injury to the wearer of the football helmet.

However, it occasionally occurs that a football player, wearer of a modern football helmet, falls or is knocked to the ground and is unconscious or otherwise in need of artificial respiration. In such event it is necessary to quickly remove the face mask of the helmet, as removal of the helmet may assert strains on the fallen football player which can cause or exacerbate a cervical strain with attendant discomfort and dangers to the football player.

At present it is known to use a knife to sever the plastic straps or connectors between the face mask and the football helmet. It is also known to use a screwdriver to unfasten the plastic straps or connectors connecting the face mask to the football helmet.

Both of the above-described methods of disconnecting the face mask from a football helmet are unsatisfactory in the emergency situation of a fallen football player needing artificial respiration.

Using a knife to sever the plastic straps or connectors often results in tedious, time consuming sawing motions being applied to the tough plastic straps or connectors with the knife. Such sawing motions translate through the plastic straps or connectors to the helmet itself, thereby causing unnecessary and possibly dangerous movement of the helmet and head of the fallen football player.

Using a screwdriver to unfasten the plastic straps or connectors connecting the face mask to the football helmet is usually ineffectual as a result of the rust and/or corrosion built up on the fasteners connecting the plastic straps or connectors to the football helmet.

No known hand-held, battery-operated rotary saw is known to be available. Such device is the instant invention.

OBJECT OF THE INVENTION

It is the primary object of this invention to provide a hand-held, battery-operated rotary saw suitable for use in rapidly cutting through the plastic straps and connectors connecting the face mask to a football helmet.

It is an additional object of this invention to provide a hand-held, battery-operated rotary saw which has a retractable or removable shield or shielding mechanism for the rotary saw blade which serves to prevent possible accidental injury from the rotary saw blade when not in use cutting plastic straps or connectors.

It is a further object of this invention to provide a hand-held, battery-operated rotary saw which has a shielding mechanism for the rotary saw blade and an on-off switch safety mechanism to avoid accidental depression of the on-off switch with attendant operation of the rotary saw blade.

DESCRIPTION OF THE PREFERRED EMBODIMENTS

Figure 1:
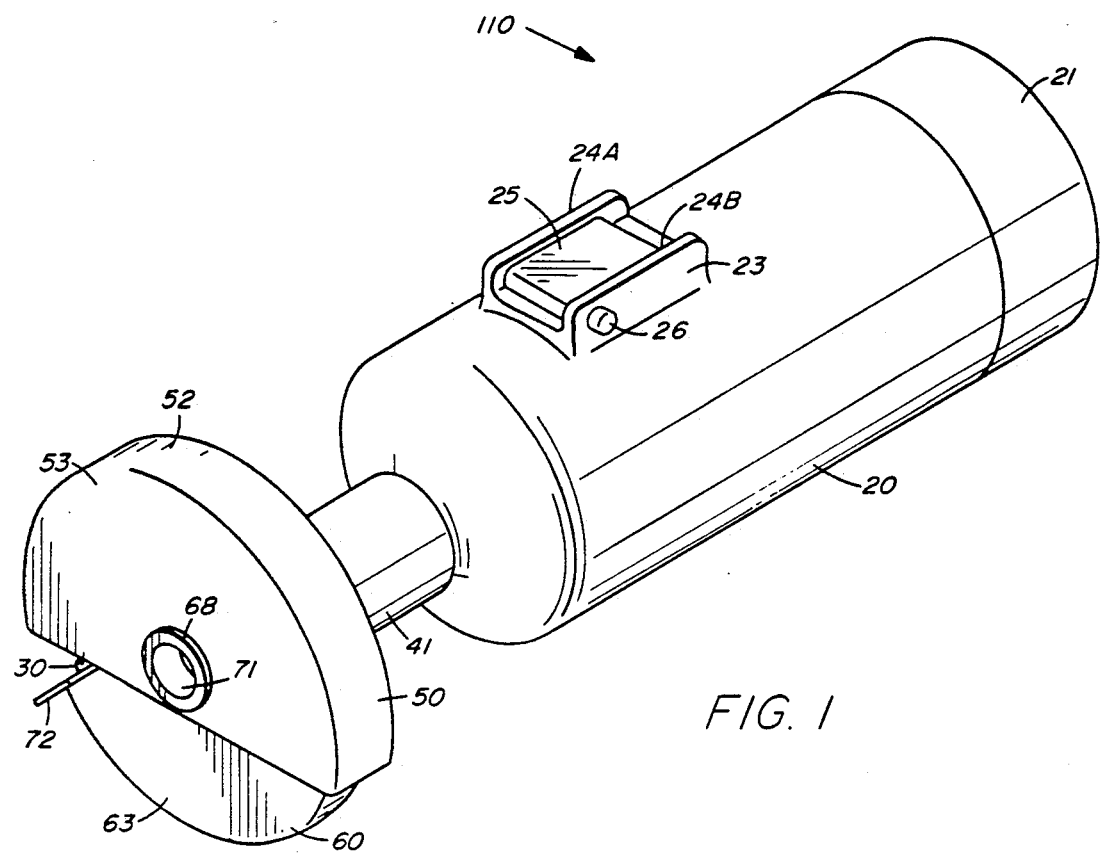
FIG. 1 is a perspective view of the first embodiment of the invention.
Figure 2:
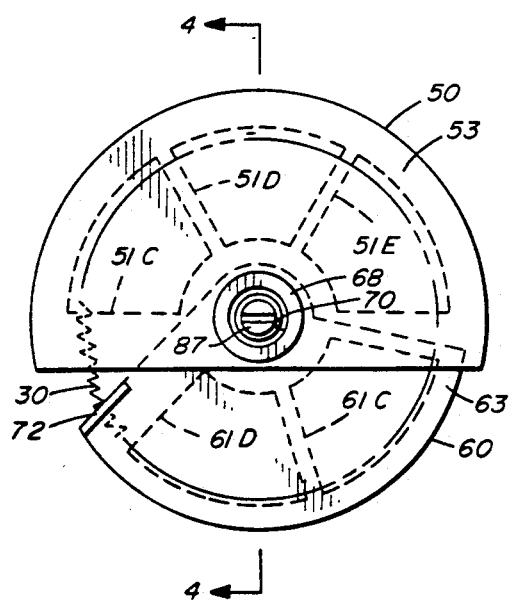
FIG. 2 is a lateral view of the rotary saw blade and shield of the first embodiment of the invention.
Figure 3:
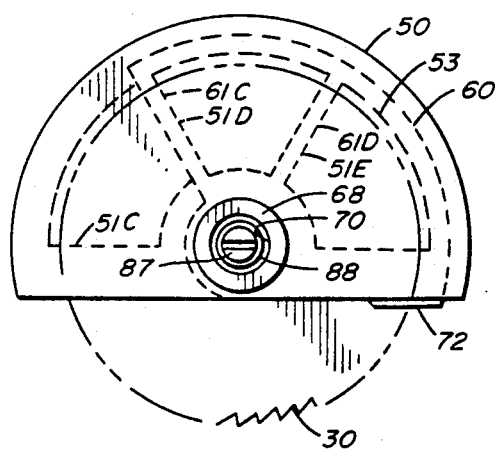
FIG. 3 is a lateral view of the rotary saw blade and shield of the first embodiment of the invention, with the shield fully retracted, exposing the rotary saw blade.

As seen in FIG. 1, the first embodiment (10) of the invention is of a hand-held, battery-operated rotary saw and comprises in major external division a housing (20), an on-off switch assembly (23), a housing access cover (21), a safety cover assembly support shaft (41), an upper blade cover (50), a lower blade cover (60), a lower blade cover handle (72), and a rotary saw blade (30).

The housing (20) serves as the handle for the invention (10) and also serves to enclose batteries, a small electric motor, and electrical connections between the batteries, the small electric motor, and the on-off switch assembly (23).

The housing access cover (21) is detachable and allows access to the interior of the housing (20) and, in particular, provides access to the batteries contained within the housing (20).

Figure 4:
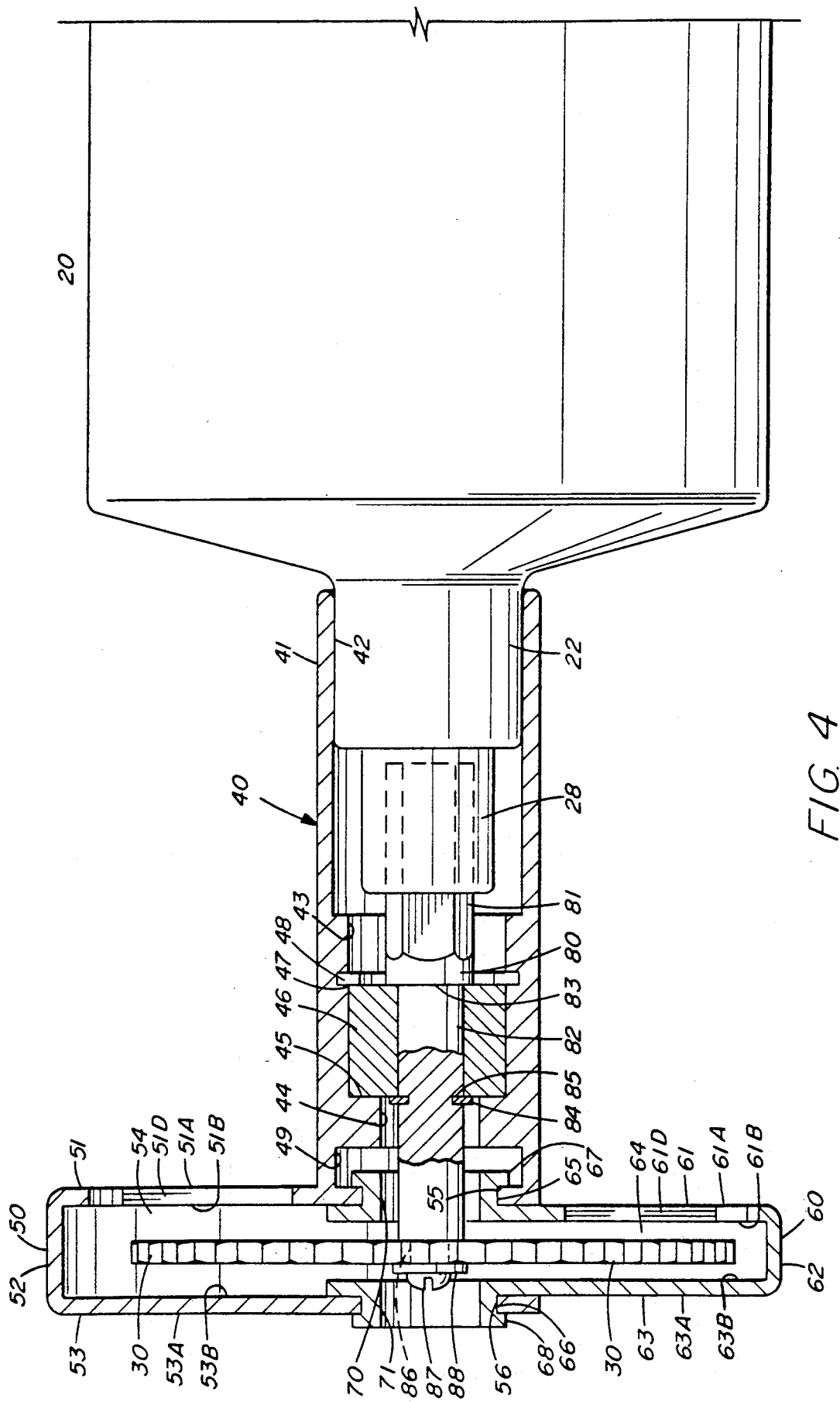
FIG. 4 is a lateral, partially cut-away, view of the first embodiment of the invention.

The on-off switch assembly (23) comprises an electro-mechanical switch with safety mechanism. As seen in FIG. 1, component parts of the on-off switch assembly (23) are an on-off switch (25) which, when depressed, causes electrical connection to be made between the batteries and the electric motor contained within the housing (20), switch safety guards (24A and 24B) which protrude up from the housing (20) on either side of the on-off switch (25) to a height greater than the level of the on-off switch (25) to avoid accidental depression of the on-off switch (25) and consequent activation of the electric motor, and a safety button (26). The safety button (26) is spring-loaded to its extended position and must be depressed simultaneously with the on-off switch (25) in order for the on-off switch (25) to be depressed and thereby activate the electric motor internal to the housing (20). The housing (20), as seen in FIG. 4, is cylindrical in shape and tapers down, on the end of the housing (20) opposite the housing access cover (21), to a smaller cylindrically shaped shaft cover neck (22). Extending through the shaft cover neck (22) from the electric motor internal to the housing (20) is the rotor shaft (28) which rotates when said motor is energized through the engagement of the on-off switch (25) by the batteries internal to the housing (20). The rotor shaft (28) provides, on its end away from the housing (20), a hexagonal socket into which is slideably engaged a drive shaft (80).

The drive shaft (80) has a hexagonally shaped portion (81) on the end of the drive shaft (80) which slideably engages the rotor shaft (28). Proceeding along the drive shaft (80) away from its end having the hexagonally shaped portion (81), the drive shaft (80) has a shoulder (83) to a reduced diameter portion (82) followed by a bushing retaining snap ring groove (85) and a square saw blade attachment neck (86).

The drive shaft (80) is tapped on the end of the square saw blade attachment neck (86) and a bolt (87) is inserted through a saw blade retaining bolt washer (88) and threadably connected to the end of the square blade attachment neck (86), thereby connecting the rotary saw blade (30), which provides a square center opening (31) and is slideably placed on and connected with the square saw blade attachment neck (86), to the drive shaft (80).

A safety shield support shaft (41) surrounds the rotor shaft (28) and the drive shaft (80), and, by slideably fitting over the shaft cover neck (22), serves to connect the blade safety cover assembly (40) to the housing (20). Additional support for the blade safety cover assembly (40) is provided by the bushing (46) which surrounds the drive shaft reduced diameter portion (82) and serves as a reduced friction interface or spacer between the drive shaft (80) and the blade safety cover assembly (40). The bushing (46) is held in place around the drive shaft reduced diameter portion (82) between the drive shaft bushing retaining snap ring (84) and the bushing retaining shoulder (45) portion of the drive shaft (80). Another snap ring (47) serves to provide additional lateral support along the length of the drive shaft (80), for the bushing (46). The snap ring (47) fits in a snap ring groove (48) in the inter surface of the safety cover assembly support shaft (41), while the bushing retaining snap ring (84) fits into a bushing retaining snap ring groove (85) in the drive shaft reduced diameter portion (82).

The safety shield cover assembly (40) provides a safety shield support shaft (41), an upper blade cover (50), and a lower blade cover (60). The safety shield support shaft (41) interior provides a support shaft right bore (42) which is the interior of the safety shield support shaft (41) which slideably fits over the shaft cover neck (22) of the housing (20), a support shaft busing bore (43), a bushing retaining shoulder (45), a support shaft reduced diameter bore (44), and a support shaft leftmost bore (49) which connects solidly to the upper blade cover (50). The upper blade cover (50) provides an upper blade cover back wall (51), an upper blade cover front wall (53), and an upper blade cover cylindrical wall (52). The upper blade cover back wall (51) and upper blade cover front wall (53) are planar, parallel to each other, and each firmly connected to the upper blade cover cylindrical wall (52). The upper blade cover back wall (50) is vented for the discharge of cuttings by provision of upper blade cover back wall voids (51C, 51D, and 51E). The connection of the upper blade cover front wall (53), upper blade cover back wall (51), and upper blade cover cylindrical wall (52), forms an upper blade cover cavity (54) within which the rotary saw blade (30) can freely rotate and within which the lower blade cover (60) can be rotated to expose the rotary saw blade (30) cutting surface. Such rotation of the lower blade cover (60) into the upper blade cover cavity (54) is guided by the presence of an upper blade cover back wall hinge opening (55) and an upper blade cover front wall hinge opening (56) to receive, respectively, a lower blade cover back wall hinge neck (65) and a lower blade cover front wall hinge neck (66).

The lower blade cover (60) provides a lower blade cover back wall (61), a lower blade cover front wall (63), and a lower blade cover cylindrical wall (62). The lower blade cover back wall (61) and lower blade cover front wall (63) are planar, parallel to each other, and each firmly connected to the lower blade cover cylindrical wall (62). The lower blade cover back wall (61) is vented for the discharge of cuttings by provision of lower blade cover back wall voids (61C and 61D). The connection of the lower blade cover front wall (63), lower blade cover back wall (61), and lower blade cover cylindrical wall (62) forms a lower blade cover cavity (64) within which the rotary saw blade (30) can freely rotate. Such rotation is made possible by the connection of the lower blade cover back wall hinge neck (65) to the lower blade cover back wall (61) and of the lower blade front wall hinge neck (66) to the lower blade cover front wall (63). The two said hinge necks (65 and 66) have centrally located circular operatures, a lower blade front wall hinge neck opening (71) and lower blade back wall hinge neck opening (70), and provide flanged structures, lower blade front wall hinge neck retainer (68) and lower blade back wall hinge neck retainer (67), to slideably engage and connect with the upper blade cover front and back wall hinge openings (56 and 55 respectively) thus allowing rotation of the lower blade cover (60) up and interior to the upper blade cover (50). The lower blade cover (60), additionally, provides a lower blade cover handle (72) to allow manual control of the rotation of the lower blade cover (60) into the upper blade cover cavity (54).

The upper blade cover (50) and the lower blade cover (60) share a common axis with the drive shaft (80) and together the upper and lower blade covers (50 and 60) when in position, allow the rotary saw blade (30) to freely rotate within their respective cavities (54 and 64) while they surround the rotary saw blade (30) and protect the surroundings from inadvertent cutting and damage.

In operation, engaging the on-off switch (25) causes the motor internal to the housing (20) to be energized thereby causing rotation of the rotor shaft (28), drive shaft (80), and rotary saw blade (30). Rotation of the lower blade cover (60) into the upper blade cover cavity (54) then exposes the cutting surface of the rotating rotary saw blade (30) to perform cutting of the surface against which the rotary saw blade (30) is applied.

Figure 5:
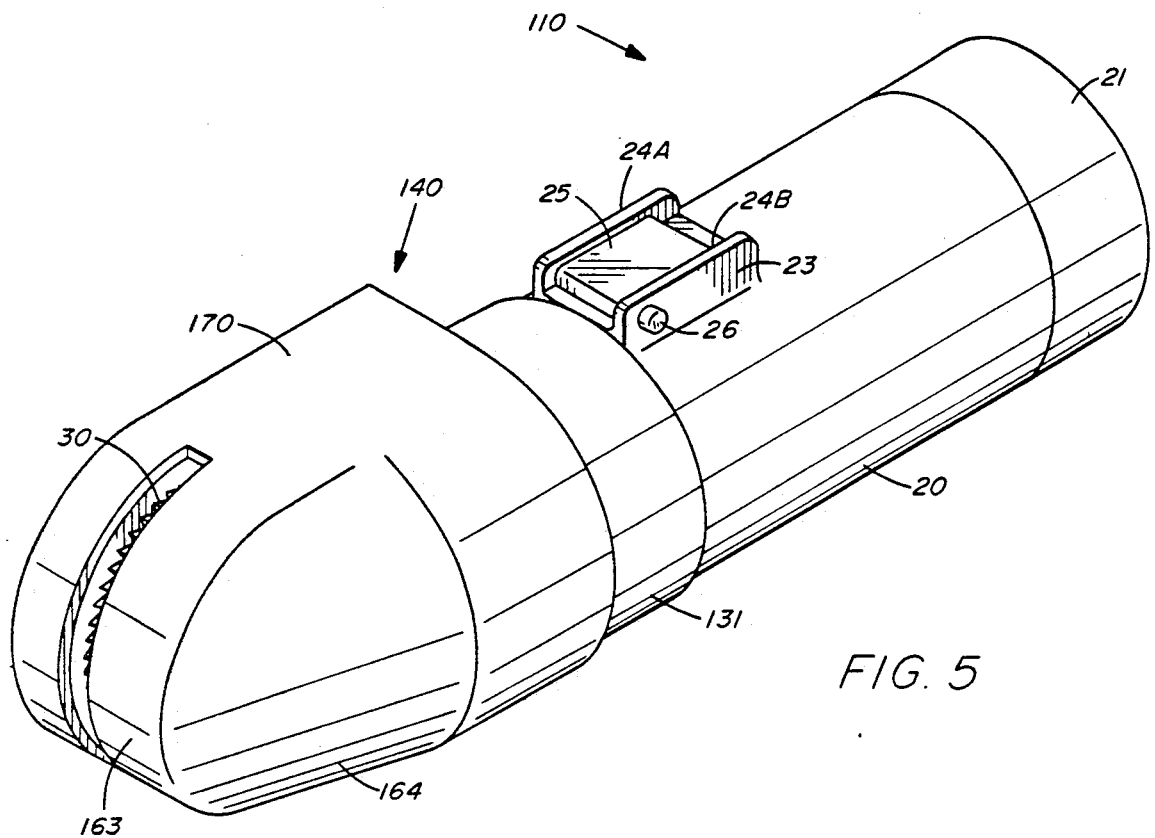
FIG. 5 is a perspective view of the second embodiment of the invention.
Figure 6:
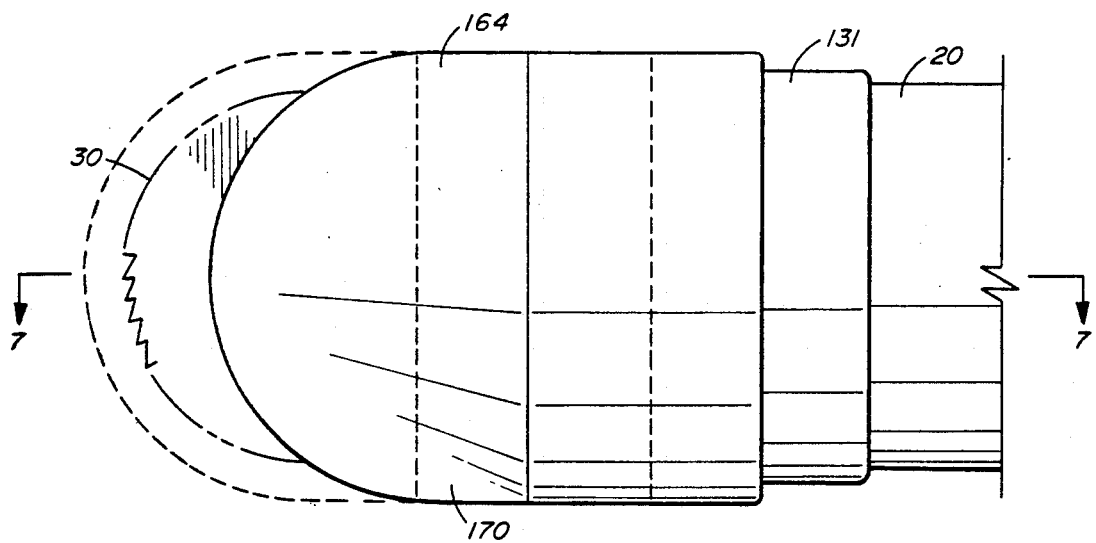
FIG. 6 is a lateral view of the cutting end of the second embodiment of the invention with the blade shield retracted, exposing the rotary saw blade.
Figure 7:
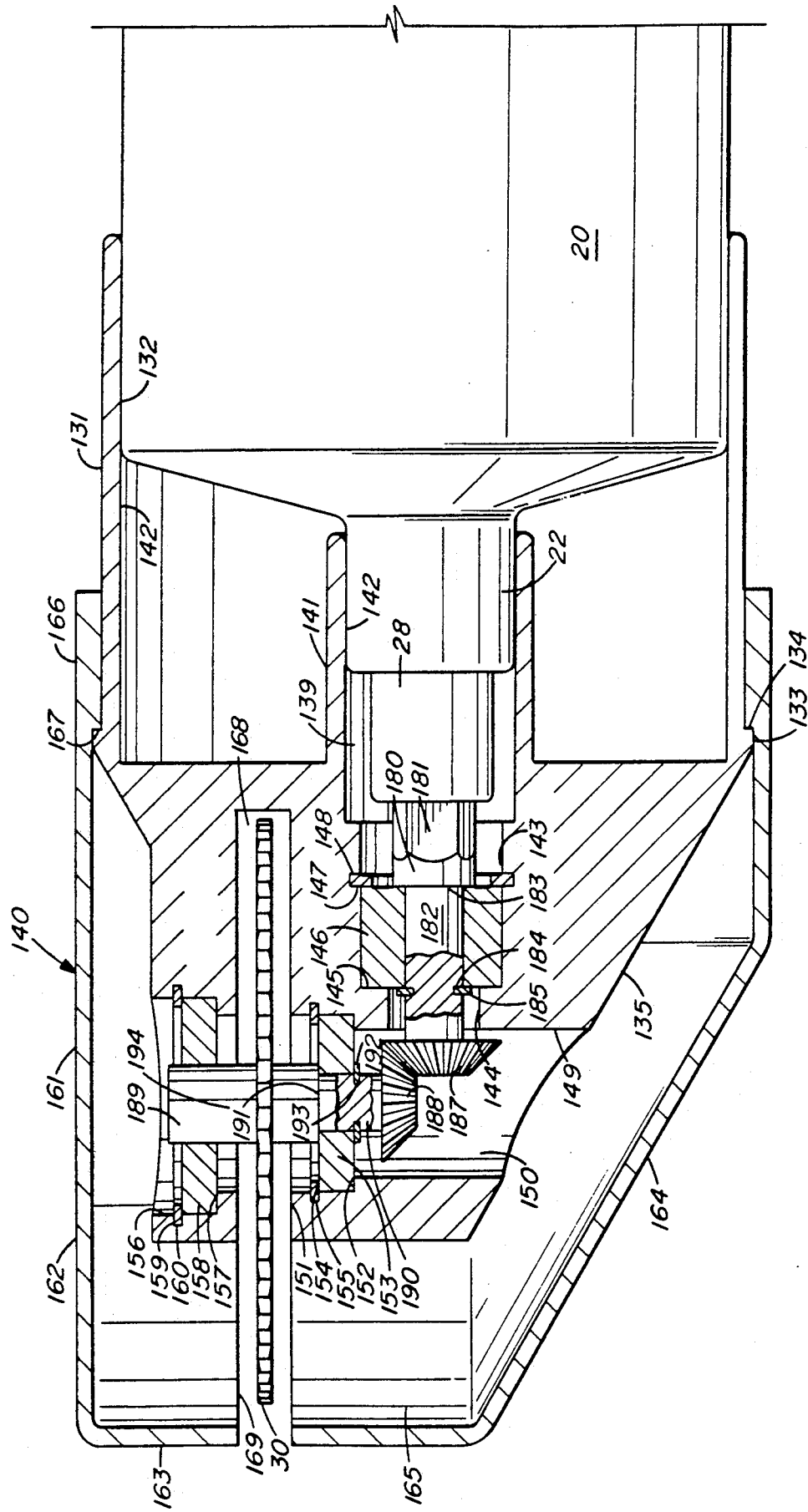
FIG. 7 is a vertical, partially cut-away, view of cutting end of the second embodiment of the invention.

The second embodiment (110) of the invention is shown in FIG. 5., FIG. 6., and FIG. 7. Said second embodiment (110) provides a unique blade safety cover assembly (140) and a pair of bevel gears (187 and 188) at right angles with one another to produce an orientation of the rotary saw blade (30) into a plane parallel with the longitudinal axis of the drive shaft (180).

The rotation of the plane, from that of the first embodiment (10) to that of the second embodiment (110), of the rotary saw blade (30) provided by the bevel gears (187 and 188) necessitates a second, saw blade drive shaft (189) for the electric motor internal to the housing's (20) connection with and transmission of rotary power to the rotary saw blade (30).

The rotor shaft (28) of the second embodiment (110) provides, on its end away from the housing (20), a hexagonal socket into which is slideably engaged a drive shaft (180). The drive shaft (180) has a hexagonally shaped portion (181) on the end of the drive shaft (180)

which slideably engages the rotor shaft (28). Proceeding along the drive shaft (180) away from its end having the hexagonally shaped portion (181), the drive shaft (180) has a shoulder (183) to a reduced diameter portion (182) followed by a bushing retaining snap ring groove (185) and a vertically oriented bevel gear (187).

The saw blade drive shaft (189) provides a saw blade drive shaft square portion (194) onto which the saw blade square center opening (31) slides, a saw blade drive shaft bushing retaining shoulder (191), a saw blade drive shaft bushing retaining snap ring groove (193), a saw blade drive shaft reduced diameter portion (190), and a horizontally oriented bevel gear (188). The saw blade drive shaft bushing retaining shoulder (191) is formed at the reduction in diameter of the saw blade drive shaft (189) to the saw blade drive shaft reduced diameter portion (190), and the saw blade drive shaft bushing retaining snap ring groove (193) is in the circumference of the saw blade drive shaft reduced diameter portion (190). The horizontally oriented bevel gear (188) is connected to the end of the saw blade drive shaft reduced diameter portion (190).

The saw blade drive shaft (189) is held in place by an upper bushing (158) and a lower bushing (153). The upper bushing (158) is positioned between a snap ring (159) which fits into a snap ring groove (160) in the safety cover mechanism housing (135), and an upper bushing retaining shoulder (157) provided by the safety cover mechanism housing (135). The lower bushing (153) is positioned between a snap ring (154) which fits into a snap ring groove (155) in the safety cover mechanism housing (135), and a lower bushing retaining shoulder (152) provided by the safety cover mechanism housing (135).

The safety cover assembly (140) has two parts, a blade cover (161) and a safety cover mechanism housing (135). The safety cover mechanism housing (135) provides a vertical drive shaft and bushing bore (149) which is compromised of an upper bushing bore (156), a lower bushing bore (151), and a gear housing bore (150). Between the upper bushing bore (156) and the lower bushing bore (151), the safety cover mechanism housing (135) provides a saw blade cavity (168) within which the rotary saw blade (30) rotates. The safety cover mechanism housing (135) also provides a horizontal drive shaft and bushing bore (139) which is comprised of a support shaft right bore (142), a bushing bore (143), a reduced diameter bore (144), and a gear housing bore (150). The gear housing bore (150) is formed by the intersection of two cylindrical bores, the vertical drive shaft and bushing bore (140) and the horizontal drive shaft and bushing bore (139), which are perpendicular to one another within the safety cover mechanism housing (135) and which form the void within which the bevel gears (187 and 188) mesh.

The safety cover mechanism housing (135) further provides a support shaft (141) the inside, support shaft right bore (142), of which fits firmly around and connects to the shaft cover neck (22). In addition to the connection of the shaft cover neck (22) to the safety cover mechanism housing (135) by the support shaft (141), additional connection and support of the safety cover mechanism housing (135) to and by the housing (20) is obtained by the safety cover assembly housing coupling neck (131). The safety cover mechanism housing (135) provides a safety cover assembly housing coupling neck (131) whose inside bore (132) is cylindrical and snugly fits over and connects to the housing (20).

The blade cover (161) is hollow and the blade cover cavity (165) contains within it the previously described safety cover mechanism housing (135) and, when the blade cover (161) is fully extended, the rotary saw blade (30). The blade cover (161), at its end closest to the housing (20), is cylindrical in shape and provides a retaining ring (166) which slideably engages the outer surface of the safety cover assembly housing coupling neck (131). When fully extended away from the housing (20), the retaining ring portion (166) of the blade cover (161) will butt up against the blade cover retaining ring shoulder (167) provided by the safety cover mechanism housing (135).

An opening (169) in the blade cover wall (163) farthest from the housing (20) is provided so that when the blade cover (161) is retracted, slid down along the safety cover assembly housing coupling neck (131) toward the housing (20), the rotary saw blade (30) is exposed for cutting. Pressing the blade cover wall (163) of the blade shield cover (161) onto the surface to be cut causes the blade shield cover (161) to slideably retract along the outer surface of the safety cover assembly housing coupling neck (131).

Operation of the second embodiment (110), once the rotary saw blade (30) is exposed, is accomplished by engaging the on-off switch (25) which causes the motor internal to the housing (20) to operate, causing the rotor shaft (28) and the slideably connected drive shaft (180) to rotate, this rotation is then transmitted through the bevel gears (187, 188) to the saw blade drive shaft (189) and thus to the rotary saw blade (30) which is firmly affixed and connected to the saw blade drive shaft (189).

Figure 8:
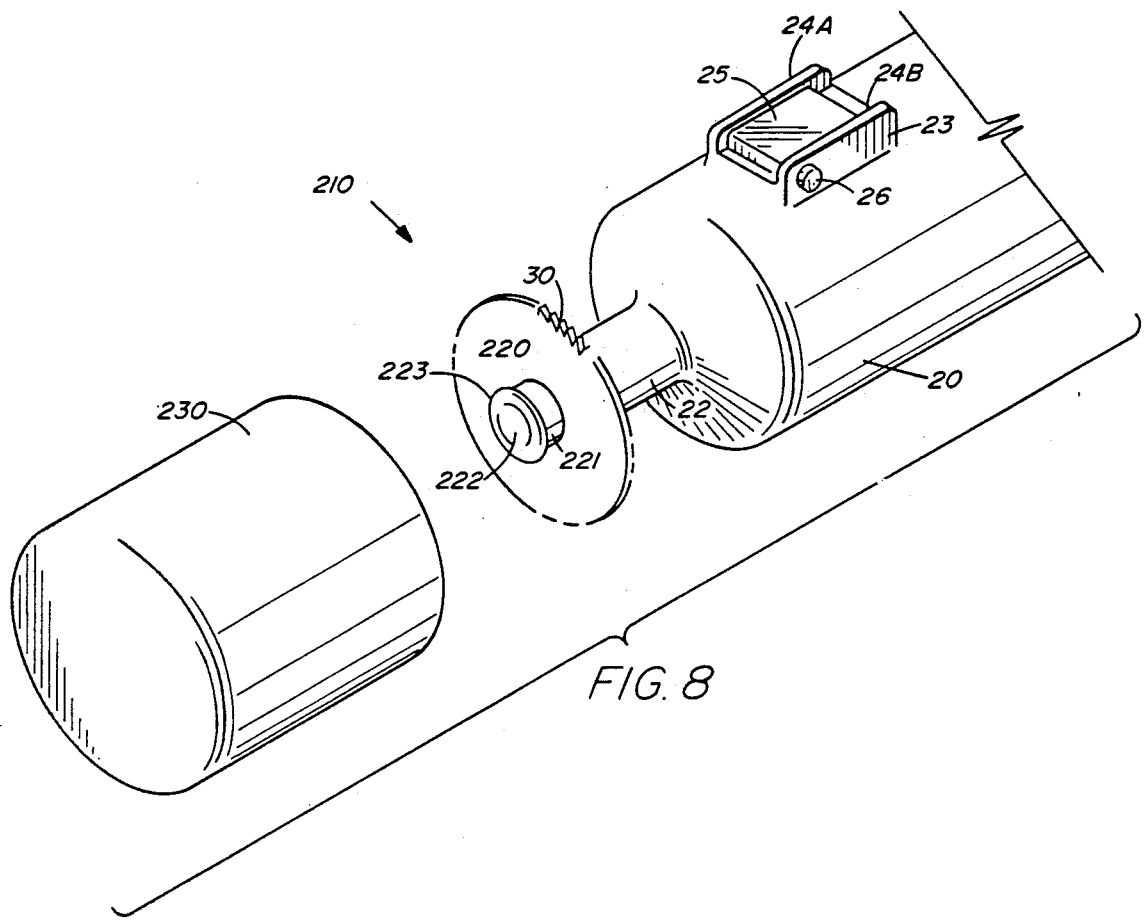
FIG. 8 is a perspective view of the third embodiment of the invention.
Figure 9:
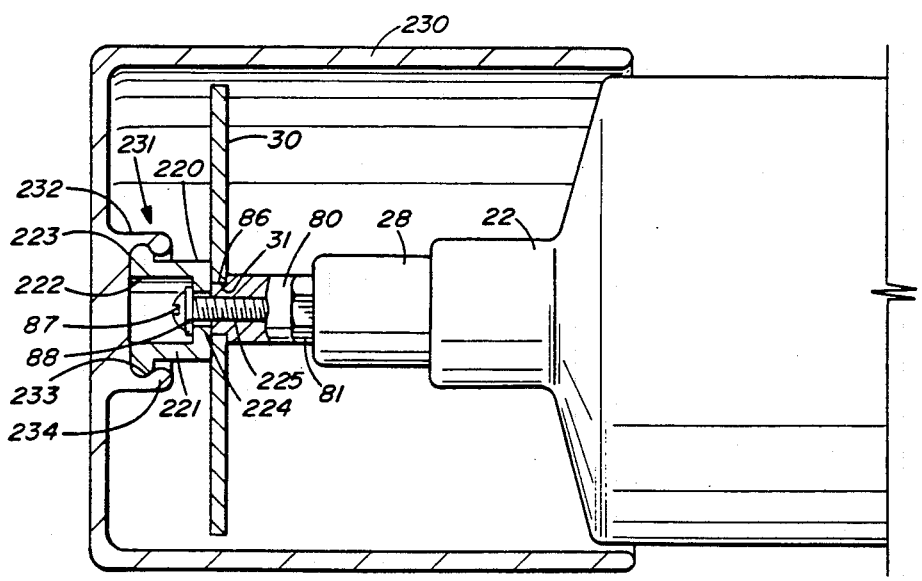
FIG. 9 is a lateral, partially cut-away, view of the cutting end of the third embodiment of the invention.

The third embodiment (210) of the invention, shown in FIG. 8 and FIG. 9., comprises in major external division a housing (20), an on-off switch assembly (23), a detachable housing access cover (21), a shaft cover neck (22), a drive shaft (38), a rotary saw blade (30), a blade cover male connector (220), and a blade cover (230).

Internal to the housing (20), the electrical connections, electrical motor, housing access cover (21) and rotor shaft (28) function as previously described. Also, the rotary saw blade (30) and drive shaft (80) are connected to the rotor shaft (28) and operate as previously described.

As seen in FIG. 8 and FIG. 9, [I] in the third embodiment (210) the blade cover (230) provides a female connector (231), comprising a female connector neck (232), a female connector shoulder (234), and a female connector bore (233) which slidably engages and accepts a male connector (220) which is comprised of flexible material and provides a male connector shoulder (223) such that force must be utilized to either attach or remove the blade cover (230) from the male connector (220). The male connector (220) provides a bolt opening (225) and is attached to the drive shaft (80) by means of the saw blade retaining bolt (87) which also connects the rotary saw blade (30) to the drive shaft (80) as previously described.

The [blade cover (230)] male connector (220) provides a male connector neck (221), a male connector bore (222), [through which is inserted the saw blade retaining bolt (87) and the saw blade retaining bolt washer (88) thereby attaching both the rotary saw blade (30) to the drive shaft (80),] a male connector shoulder (223) and a male connector bolt opening (225). A retaining bolt (87) is inserted through the saw blade retaining bolt washer (88) into the male connector bolt opening (225) thereby attaching both the rotary saw blade (30) and the male connector (220) to the drive shaft (80).

The blade cover (230) provides a female connector (231) which comprises a female connector neck (232) and a female connector shoulder (234) which by interaction with the male connector shoulder (223) opposes the slideable insertion of the male connector (220) into the female connector bore (233). However, once slideably inserted, the male connector shoulder (223) and the female connector shoulder (234) act, again in opposition, to resist retraction of the male connector (220) from the female connector bore (233).

The blade cover (220) is hollow and cylindrically shaped, such that, when in its engaged position, it completely encompasses and surrounds the rotary saw blade (30). Internal to the shell of the blade cover (220) is a female connector fitting (231) which slideably engages, with force applied, the male connector (220) when the blade cover (230) is in its engaged position, thus shielding the rotary saw blade (30) from inadvertent contact with objects exterior to the blade cover (230).

In operation, the blade cover (220) is forcibly, slideably removed from its engaged position causing the male connector (220) to disengage from the female connector (231), thus exposing the rotary saw blade (30) for use. Activation of the on-off switch assembly (23) then causes rotation of the rotary saw blade (30) as previously described.

This invention has been described in terms of but three preferred embodiments, however numerous additional embodiments are possible without departing from the essential characteristics thereof. Accordingly, the description has been illustrative and not restrictive as the scope of the invention is defined by the appended claims, not by the description preceding them, and all changes and modifications that fall within the stated claims or form their functional equivalents are intended to be embraced by the claims.

What is claimed is:

1. A hand-held, battery operated rotary blade saw comprising:
   a housing,
   batteries contained within said housing,
   an electro-mechanical on-off switch,
   a battery operated motor contained within said housing,
   electrical connections between the said batteries and said motor through said electro-mechanical switch,
   a rotor shaft extending out of said motor through said housing,
   a rotary saw blade attached to said rotor shaft, and
   a removable rotary saw blade shield which protects the rotary saw blade from inadvertent contact with objects exterior to the device;
   wherein:
   the exterior of said housing serves as a handle, and the surface of said housing provides a detachable housing access cover; and
   said removeable rotary saw blade shield comprises: a blade cover which is hollow and cylindrical in shape and provides both a blade cover male connector and a blade cover female connector.

2. The device of claim 1 wherein:
   said blade cover male connector is connected to said rotor shaft and provides a male connector neck and a male connector shoulder comprised of flexible material; and
   wherein:
   said female connector is attached to the interior of said blade cover and is comprised of a female connector neck, a female connector shoulder, and a female connector bore which slideably engages said male connector neck thereby connecting said blade cover to said housing, shielding said rotary saw blade from inadvertent contact with objects exterior to said blade cover.

3. The device of claim 1 wherein:
   said rotary saw blade is attached to a drive shaft; and
   said drive shaft is slideably attached to said rotor shaft.

4. The device of claim 2 wherein:
   said rotary saw blade is attached to a drive shaft; and
   said drive shaft is slideably attached to said rotor shaft.

* * * * *